Aug. 23, 1966   E. G. THOMAS   3,267,778
COPYING DEVICES
Filed Nov. 27, 1964   2 Sheets-Sheet 1
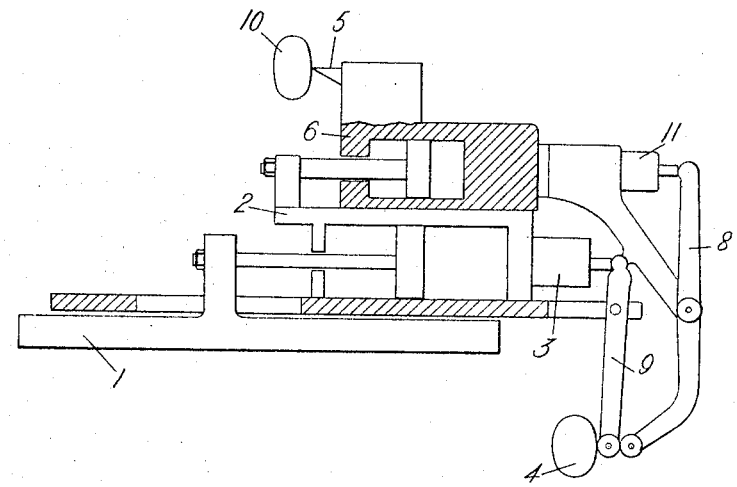
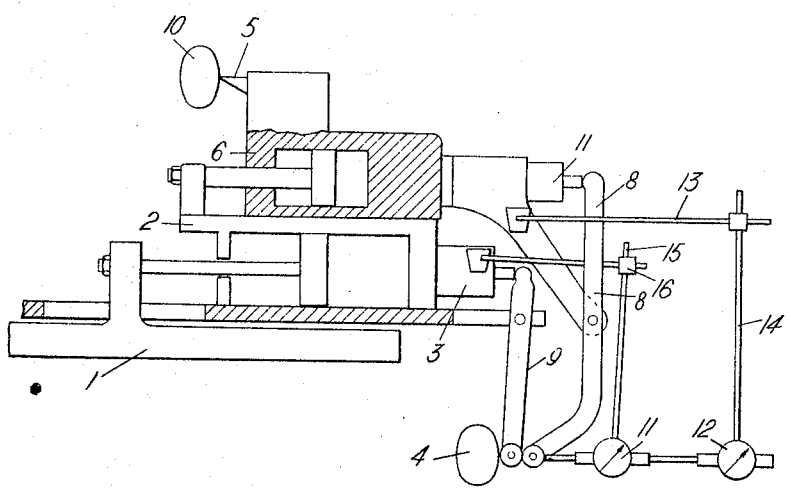
Inventor
Edward Gordon Thomas
By
Cushman, Darby & Cushman
Attorneys 3,267,778
COPYING DEVICES
Edward G. Thomas, Adlington, England, assignor to
J. & E. Arnfield Limited, Audenshaw, England, a
corporation of Great Britain
Filed Nov. 27, 1964, Ser. No. 414,248
Claims priority, application Great Britain, Nov. 27, 1963,
49,633/63; June 25, 1964, 26,375/64
3 Claims. (Cl. 82—14)

The present invention relates to copying devices. Such devices may be used in any application in which the movement of one member is to be an accurate copy of the movement of another and one particular use is with lathes and other machine tools.

As an example, when such a copying device, is used in a machine tool a model or template is caused to rotate at the same rate as the workpiece relative to the tool itself of the machine tool. A follower which bears against the model or template, is caused to move by the contours of the model or template as the latter rotates or otherwise moves. The movement which is thus given to the follower is transmitted to the tool itself of the machine tool which thus cuts the workpiece to the same shape as the template or follower.

The linkage between the follower and the tool itself can take a number of different forms for example it may be hydraulic, electrical, electronic, electromechanical etc., but it must be capable of transmitting sufficient force to hold the tool firmly in the correct position indicated by the follower.

Conventional copying devices work reasonably well when the rates of acceleration of the tool are small, as in ordinary cylindrical copy turning. However, when these devices are applied to the turning of a cam or other workpiece, in which the tool must reciprocate over a considerable distance during each revolution of the workpiece, the error or "lag" in such a system produces considerable inaccuracies.

It is an object of the present invention to provide a copying device in which the above disadvantages are eliminated or reduced.

According to the present invention there is provided a copying device for regulating the movement of a first member in response to the movement of a second member wherein an intermediate element is movable in response to movement of said second member, said first member being carried by said intermediate element for movement therewith and so as to be movable relative thereto in response to the movement of said second member.

In one practical form the invention provides a copying device in which a first cross slide is movable in response to movement of a follower on the model being copied, and a second cross slide is carried by the first cross slide for movement therewith and so as to be movable relatively thereto in response to the movement of said follower on said model, the tool being connected to said second cross slide. Usually, the stroke of movement of the second cross slide is shorter than that of the first cross slide and the second cross slide is of lighter construction than the first.

Although the invention is primarily applicable to hydraulic copying devices it may equally well be applied to electrical, electronic, electromechanical or other forms of copying device.

Where the copying device is of the hydraulic type the follower may then act on the spool of a stylus valve to control the movement of the associated slide. For the ultimate in accuracy of reproduction it is essential that both of the stylus valves are operated by linkage which transmit the signal from the template in a truly linear fashion and conveniently the follower is mounted on a sensing arm rockable about a pivot secured to the associated slide.

It is possible for only a single follower to be associated with both of the slides, but it is preferable to have two followers, one for each slide. Naturally the two followers must act on the same point of the template being copied and this may be achieved either by the second follower taking its movement from the first or, alternatively, by the two rockers being side by side on a wider-than-normal template.

However, if the model being copied is three-dimensional rather than a two-dimensional template, then it will not be possible to use this latter method.

If one wishes to copy three-dimensional work then the follower must be given the same longitudinal movement as the tool itself, e.g. by the lead screw in a copying lathe. In three-dimensional work it is also essential that the shape of the follower is the same as the shape of the tool point. However, care must be taken in choosing the tool point shape to ensure that the shape of the follower does not have a radius of curvature which is in excess of the minimum radius of curvature of concave surfaces of the model, since the follower must be able to penetrate fully into such concave surfaces.

The copying device may have the tool post mounted on top of the second cross-slide or, alternatively, the tool post may be mounted on the same base as the first cross-slide and be connected rigidly to the second cross-slide for movement therewith. With such an arrangement the tool is more rigidly mounted and thus gives a better finish to the workpiece and a more accurate copy of the model or template.

In order that the present invention may more readily be understood, the following description is given, merely by way of example, of three forms of copying device according to the invention. Reference is made to the accompanying drawings in which:

FIGURE 1 shows a schematic sectional view of one form of copying device according to the invention;

FIGURE 2 is a view similar to FIGURE 1, illustrating the addition of dial indicators for determining the accuracy of the device;

Figure 3:
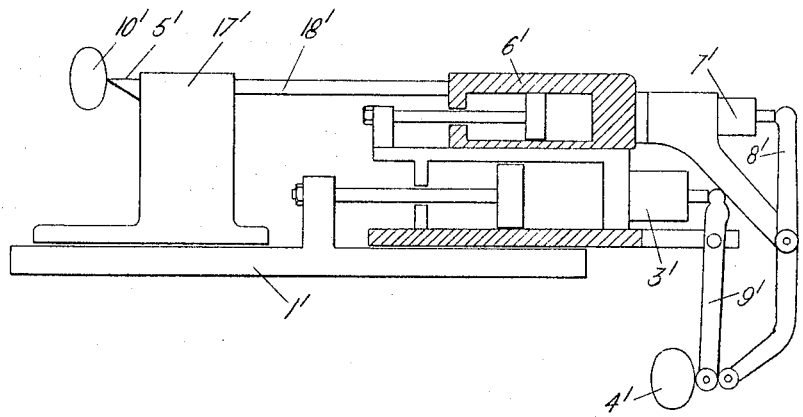
FIGURE 3 is a view similar to FIGURE 1 of a modified device according to the invention.

FIGURE 1 shows a lathe saddle 1, carrying a first cross slide 2 movable relative to the saddle by means of a hydraulic piston and cylinder arrangement. The piston is fixed to the saddle 1 and the cylinder is movable relative thereto, hydraulic fluid being admitted to the cylinder under the control of the stylus valve 3. The spool of the stylus valve is controlled by a rotating model or template 4, which is arranged to rotate at the same speed as the workpiece 10 being machined.

Operation of the spool of the stylus valve is effected through sensing arm 9 which is pivoted to cross slide 2. The arrangement so far described is similar to conventional hydraulic copying devices except that the tool holder, carrying tool 9, is normally clamped rigidly to the cross slide 2. In the hydraulic copying device of the present invention the tool holder is clamped to a second cross slide 6, which is of a lighter construction than slide 2 and which is hydraulically movable relative to cross slide 2, the stroke of movement being less than that of the latter. As before, the movement is effected via a hydraulic piston and cylinder arrangement, the piston being secured to cross slide 2, while the cylinder is movable under the action of hydraulic fluid admitted and controlled through stylus valve 7. The spool for the stylus valve 7 is actuated by a sensing arm 8 which is rockable about a pivot secured to the cross slide 6. A follower on the sensing arm 8 is in contact with the follower on the main sensing arm 9. With this arrangement the sensing arm 8 is moved with the sensing arm 9 under the action of the rotating model or template 4. Alternatively, the follower on sensing arm 9 may be placed in side-by-side relation to the follower on sensing arm 8, the model or template 4 being of a suitably greater width.

In operation of the described device, the cam or template 4 is rotated from the position shown, in which both stylus valves are in a neutral position; the lever 9 will rock in an anti-clockwise direction, moving the spool of valve 3 and admitting oil to the cylinder of slide 2 in such a manner as to drive the slide 2 to the right. Due to the dead spots in the valve 3 and the inertia of the slide, the slide will lag behind the movement of the follower on the lever 9, and thus cause the error or lag in the system. However, since the follower on sensing arm 8 is in abutting relationship with the follower on sensing arm 9 or with the model or template 4, the error causes the lever 8 to be displaced from its neutral position. The spool of valve 7 is thus displaced, admitting oil to the cylinder in slide 6 in such a manner as to drive slide 6 to the right until both levers 8 and 9 are in a neutral position, whereupon tool 5 is in its correct position. Thus, it will be seen that the auxiliary slide 6 and the associated valve 7 and sensing arm 8 have compensated for the error introduced by the main copying slide 2, thus producing a more accurate workpiece.

The device illustrated in FIGURE 2 is identical with that of FIGURE 1 except for the addition of two dial indicators 11 and 12. The indicator 12 is secured in a conventional manner by means of rods 13 and 14 and the usual clamps, to the housing of control valve 7, while the indicator 11 is similarly secured by means of rods 15 and 16 to the housing of the control valve 3. Indicator 11 is of the "through spindle" type the spindle on one side of the indicator bearing on the follower attached to lever 8, while the spindle on the other side of indicator 11 actuates the spindle of indicator 12. Thus the movement of slide 2 relative to the movement of the follower is shown on indicator 11 which thus shows the error of the movement of slide 2. Similarly the reading of dial indicator 12 indicates the error of the movement of slide 6 and therefore of the tool 5 and of the actual workpiece 10.

In one experiment carried out using the copying device used on a copying lathe for turning a cam surface, the swing on the indicator 11 was 0.065" while that on the indicator 12 was 0.005" when the workpiece was rotated at 35 r.p.m. It is thus clear that with the device according to the invention a remarkable improvement in the accuracy of the workpiece is achieved.

The device illustrated in FIGURE 3 is very similar to that illustrated in FIGURE 1 and like reference numerals have been used for like parts and have been shown with a prime. In this embodiment the tool 5' is not carried on a toolpost supported directly on the second slide 6', but, instead, is mounted on a toolpost 17' which itself is slidable on the lathe saddle 1'.

The toolpost 17' is secured to the second slide 6' by means of a rigid connector 18'. With this arrangement it has been found that the toolpost is more rigidly held, so that the tool is more firmly supported, thereby reducing any tendency to chatter and thus improving the finish and accuracy of the workpiece.

Figure 4:
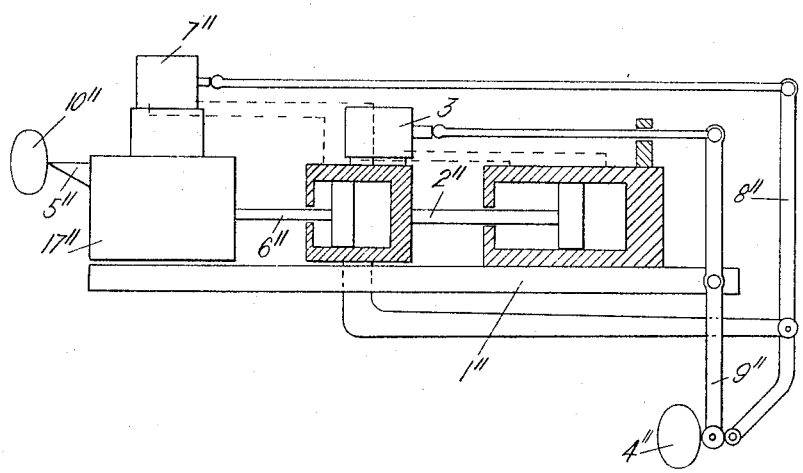
FIGURE 4 is a view similar to FIGURE 1 of a further modification.

The device of FIGURE 4, again is similar to that of FIGURE 1 like parts being given like reference numerals but with double primes. In this embodiment the second slide 6" is in tandem with the first slide 2".

If any of these devices is to be used with a three dimensional model for three dimensional work then, as is customary, the saddle will be moved axially of the workpiece by means of the lathe lead screw, this axial movement also being imparted to the follower bearing against the model or template 4. It is most important in such operation that the point of the follower should have the same shape as the point of the tool to ensure an accurate reproduction of the model. Similarly the follower should be so shaped that the maximum radius of curvature is not in excess of the minimum radius of curvature of any concave surfaces on the model, to ensure full penetration of the follower into such concave surfaces.

The device of the invention is particularly suitable for machining the surfaces of the engaging parts of a helical gear pump, such as that sold under the Registered Trade Mark "Mono."

The invention has been particularly described with reference to a hydraulic copying device, but it will be appreciated that it can equally be applied to other forms of copying devices such as electrical, electronic, or electromechanical devices. Furthermore, the invention also includes copying devices in which the movement of the two slides is effected by different means, for example one slide may be controlled hydraulically while another is controlled electromechanically. Similarly, while the device has been illustrated as being applied to a copying lathe it may be used for any copying operation, including cylindrical copy turning, copy planning, grinding, milling, etc.

I claim:

1. A copying device for use in controlling the movement of a machine tool in conformity with the contour of a model being copied, such device comprising, in combination, a first cross-slide, a first sensing arm rockable about a pivot secured to said first cross-slide, a first follower on said first sensing arm effective to follow the contour of said model, means for moving said first cross-slide in response to movement of said first follower on a model being copied, a second cross-slide carried by said first cross-slide for movement therewith, a second sensing arm rockable about a pivot secured to said second cross-slide, a second follower on said second sensing arm effective to follow the contour of said model and means for moving said second cross-slide relative to said first cross-slide in response to movement of said second follower on a model being copied and means for connecting said second cross-slide to said tool.

2. A copying device for use in controlling the movement of a machine tool in conformity with the contour of a model being copied, such device comprising in combination a bed, a first cross-slide slidable on said bed, a tool post mounted for sliding movement on said bed, follower means effective to follow the contour of said model, means for moving said first cross-slide in response to movement of said follower means on a model being copied, a second cross-slide carried by said first cross-slide for movement therewith, means for moving said second cross-slide relative to said first cross-slide in response to movement of said follower means on a model being copied and means connecting said tool post relative to said second cross-slide, said tool being secured to said tool post.

3. A copying device for use in controlling the movement of a machine tool in conformity with the contour of a model being copied, such device comprising first follower means effective to follow the contour of said model, a first cross-slide, means for moving said first cross-slide in response to movement of said first follower means on a model being copied, second follower means, a second cross-slide carried by said first cross-slide for movement therewith, means for moving said second cross-slide relative to said first cross-slide in response to movement of said second follower means on a model being copied and means for connecting said second cross-slide to said tool.

References Cited by the Examiner

UNITED STATES PATENTS 2,727,419   12/1955   Evans ---------------- 82—14

FOREIGN PATENTS 1,283,708   12/1961   France.

WILLIAM W. DYER, Jr., *Primary Examiner.*

G. A. DOST, *Assistant Examiner.*